June 11, 1957  G. E. REINKER  2,795,721
ULTRAVIOLET LAMP
Filed Oct. 19, 1951

Inventor:
Gerald E. Reinker,
by Vernet C. Kauffman
His Attorney

United States Patent Office 2,795,721
Patented June 11, 1957

2,795,721
ULTRAVIOLET LAMP

Gerald E. Reinker, Shaker Heights, Ohio, assignor to General Electric Company, a corporation of New York Application October 19, 1951, Serial No. 252,125

3 Claims. (Cl. 313—112)

My invention relates to electric lamps generally, and more particularly to ultraviolet lamps, such as mercury vapor electric discharge lamps.

It is well known that short-wave ultraviolet radiations, particularly those in the range of about 1800 to 2000 Angstrom units, such as the mercury line radiation of 1849 A., produce ozone. In certain applications of ultraviolet lamps, concentrations of ozone may be objectionable. It is therefore an object of my invention to provide means for substantially eliminating the ozone-producing radiations without materially affecting the longer ultraviolet radiations such as those above about 2800 A.

It is a further object of my invention to so modify the lamp envelope by a relatively simple treatment thereof as to render it substantially impervious to the ozone-producing radiations.

Figure 1:
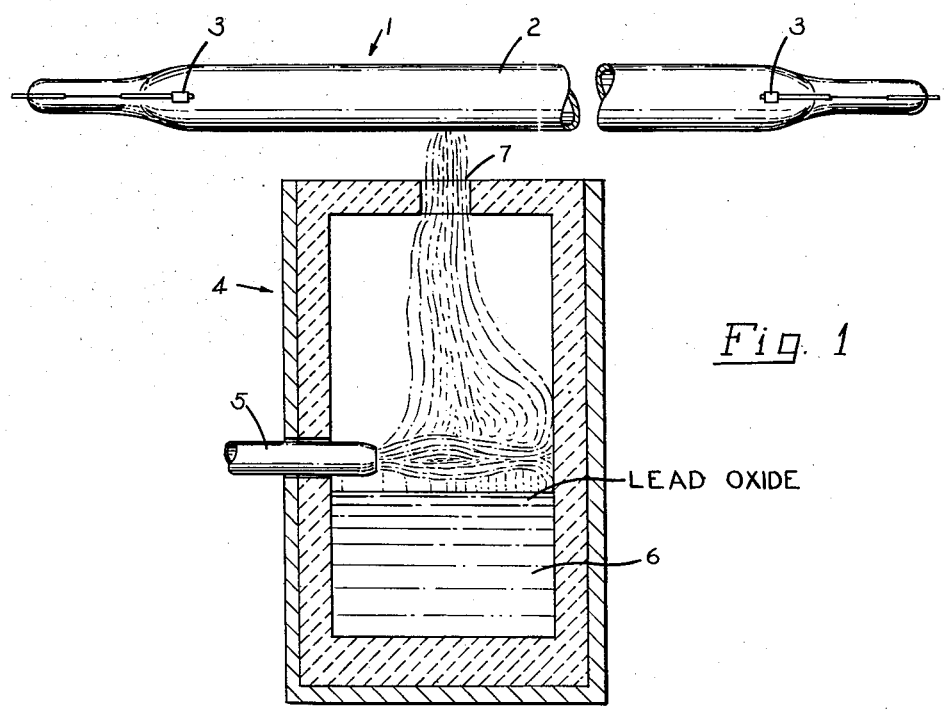
Figure 2:
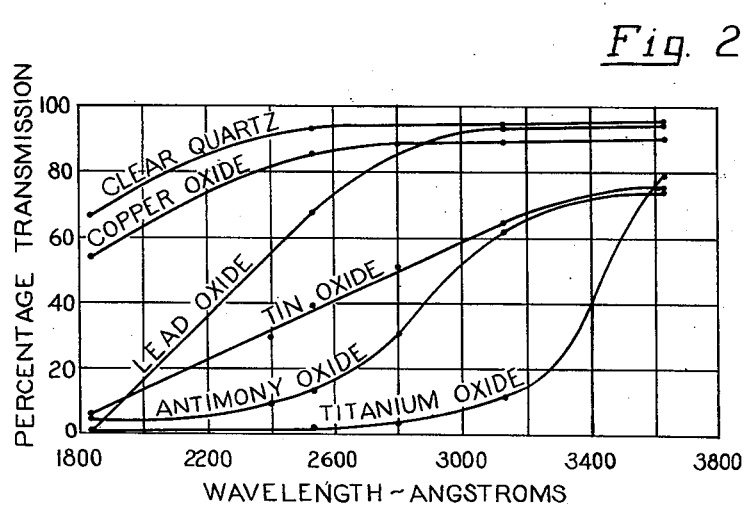

Further features and advantages of my invention will appear from the following description taken in conjunction with the accompanying drawing wherein Fig. 1 is an elevation of one form of ultraviolet lamp together with an elevation, in section, of a furnace suitable for treating the surface of the lamp in accordance with my invention, and Fig. 2 is a graph illustrating the ultraviolet transmission of clear quartz with and without surface treatment thereof in accordance with my invention.

It is known that certain vitreous materials, including quartz and certain boro-silicate glasses, are highly transmissive of ultraviolet radiations. For instance, clear fused quartz made from quartz crystals under vacuum is highly transmissive of ultraviolet radiations down to and including 1849 A. units at which wavelength it has a transmission of 60 to 70 percent for a thickness of one millimeter. I have found that the ozone-producing radiations may be reduced or eliminated by the application of different metallic oxide coatings to the surface of the quartz or other vitreous materials. I have further found that in this respect coatings of lead oxide are unique in virtually eliminating the short radiations of about 1849 A. while transmitting substantially undiminished the longer ultraviolet radiations above about 2800 A.

It will be seen from Fig. 2 that whereas clear quartz treated with lead oxide is virtually opaque to the short radiations of 1849 A., it is nearly as transparent to the longer ultraviolet radiations as is the clear quartz itself. On the other hand, a copper oxide treatment of the quartz surface has very little effect on ultraviolet transmission throughout the range from 1800 to 3600 A. while coatings of the oxides of tin, antimony and titanium render the quartz highly opaque to the short radiations of 1849 A. but are also quite highly opaque to the longer ultraviolet radiations. In applying the coatings of copper, titanium, tin and antimony, the quartz was heated to about 500° C. and sprayed with an alcohol solution of the chloride salts of the several metals.

In applying a lead oxide coating in accordance with my invention, I prefer to employ a process wherein litharge or lead oxide is heated to a sufficiently high temperature to cause it to evolve a fume. The lamp envelope, at ordinary room temperature, is held in the fumes until a light, even coating of fumed lead oxide is deposited on the surface thereof. This coating may be white or yellowish or even black in appearance depending upon whether the envelope is exposed to the oxidizing or the reducing portions of the flame, and it can be readily wiped off. However, upon heating the envelope to an elevated temperature of several hundred degrees in an oxidizing atmosphere, conveniently air, the coating is fused into the surface and becomes clear and virtually invisible.

Referring particularly to Fig. 1, the lamp shown therein is of a type having an elongated tubular envelope 2 of clear quartz or other vitreous material which is pervious to ultraviolet radiations including the ozone-producing radiations. The lamp 1 may be, by way of example, of the general type shown in Patents 2,202,199—Germer, 2,094,694—Bol et al., and 2,363,531—Johnson, which are illustrative of ultraviolet lamps of the high pressure mercury vapor type. The lamp 1 has a pair of electrodes 3, 3 sealed therein and which may be of the thermionic, electron-emitting type. The envelope 2 also preferably contains a filling of a starting gas such as argon or other rare gas at a comparatively low pressure of several millimeters, as well as a quantity of mercury which is vaporized during operation of the lamp to produce a high pressure constricted arc discharge.

Also shown in Fig. 1 is a furnace 4 which may be employed to supply the lead oxide fumes. The furnace is lined with fire clay and is provided with a burner 5 in the side wall thereof and above the surface of a charge 6 of lithrage or lead oxide. The furnace is also provided with an opening 7 at the top thereof through which escape the flames and the fumes of lead and lead oxide.

To coat the tube or envelope 2, the litharge 6 is heated to a temperature at which it evolves fumes (approximately 900 to 1000° C.) by a reducing flame of natural gas, for example, from the burner 5. The lamp 1 is grasped by the ends and passed slowly and at a uniform rate from end to end over the opening 7 in the furnace 4. This should require about 5 to 30 seconds, depending upon the rate of evolution of lead oxide, for a lamp 1 of about four foot length. This step is repeated several times while rotating the lamp about 90° between each pass, until the surface of the envelope 2 acquires a light, smoky or cloudy appearance. The coating will have a whitish or yellowish appearance when the lamp is held just above or in the oxidizing portion of the flame issuing from the opening 7, and will have a blackish appearance when the lamp is held in the reducing portion of the flame.

The lamp as thus coated is then heated in an oxidizing atmosphere to a temperature above about 400° C. but below the softening point of the vitreous material of the envelope until the coating is fused into the surface and becomes clear. This may conveniently be done by placing the lamp in a fixture comprising highly reflecting surfaces and then operating the lamp from its normal circuit to produce a discharge between the electrodes 3, 3 whereby the wall of the envelope 2, at the top center thereof, attains a temperature of 500 to 600° C. This temperature may be maintained for about five minutes.

It appears that the thickness of the coating applied to the lamp envelope is not at all critical provided only that upon heating the envelope in the second step described above the finished coating is substantially clear, although it may have a slight purplish iridescence. In one case, three lengths of quartz tubing 35.5 cm. long and 11.5 mm. in outside diameter were found to contain a total content of lead (Pb) of 0.0137 gm., or about .035 milligrams per square centimeter. However, good results are also obtained with coatings having densities in the range of about .019 to .065 mg./sq. cm. The precise nature of the lead in the coating is not known. Solution of the coating surface in dilute nitric acid removes about one-half the lead, the other half being removable by treating the tubes with HF. This would seem to indicate that the lead is not present entirely as lead oxide or metallic lead since in that case it should have been removed with nitric acid. The removal of some of the lead with HF would indicate the presence of lead silicate or the fact that the lead was burned into the quartz until it was not readily soluble in nitric acid.

It will be noted that the fusing or firing of the coating may take place, as in the example cited above, at temperatures below the melting point of lead oxide, thus making it feasible to apply the process to envelopes or tubes of glass having softening points below the melting point of the lead oxide.

What I claim as new and desire to secure by Letters Patent of the United States is:

1. A gaseous electric discharge lamp comprising an envelope of clear quartz which is highly transparent, except for a thin transparent fused surface layer thereof, to ultraviolet radiations including the ozone-producing radiations of about 1800–2000 Angstrom units wavelength as well as the longer ultraviolet radiations, and means in said envelope for producing an electric discharge which emits such ultraviolet radiations, said surface layer consisting of the heat reaction product of the quartz with lead oxide and being highly opaque to said ozone producing radiations but highly transmissive of ultraviolet radiations of longer wavelength, the quantity of lead in said surface layer being in the range of .019 to .065 milligrams per square centimeter of the surface.

2. A gaseous electric discharge lamp comprising an envelope of clear quartz which is highly transparent, except for a thin transparent fused surface layer thereof, to ultraviolet radiations including the ozone-producing radiations of about 1800–2000 Angstrom units wavelength as well as the longer ultraviolet radiations, and means in said envelope for producing an electric discharge which emits such ultraviolet radiations, said surface layer being on the exterior of said envelope and consisting of the heat reaction product of the quartz with lead oxide and being highly opaque to said ozone-producing radiations but highly transmissive of ultraviolet radiations of longer wavelength, the quantity of lead in said surface layer being approximately .035 milligrams per square centimeter of the surface.

3. In the treatment of an ultraviolet lamp having an envelope of clear quartz which is pervious to ultraviolet radiations including the ozone-producing radiations of about 1800–2000 Angstrom units wavelength as well as the longer ultraviolet radiations, the method of substantially inhibiting the transmission through said envelope of such ozone-producing radiations which comprises heating lead oxide to a temperature sufficiently high to cause it to evolve a fume and depositing on the surface of said envelope a thin cloudy coating of the fumes of lead oxide in an amount corresponding to about .019 to .065 milligrams of lead per square centimeter of said surface and then heating said envelope to an elevated temperature above about 400° C. but below the softening point of the vitreous material, and continuing the heating until the said coating is fused into a transparent layer at the surface of the envelope.

References Cited in the file of this patent
UNITED STATES PATENTS

| | | |
|---|---|---|
| 1,877,932 | Meyer | Sept. 20, 1932 |
| 1,968,822 | Gaidies | Aug. 7, 1934 |
| 2,161,824 | Krefft | June 13, 1939 |
| 2,247,409 | Roper | July 1, 1941 |
| 2,272,992 | Hebo | Feb. 10, 1942 |
| 2,295,626 | Beese | Sept. 15, 1942 |
| 2,362,385 | Libby | Nov. 7, 1944 |
| 2,366,516 | Geffcken | Jan. 2, 1945 |
| 2,434,980 | Bilofsky | Jan. 27, 1948 |
| 2,469,410 | Rentschler | May 10, 1949 |
| 2,563,901 | Nagy | Aug. 14, 1951 |